United States Patent [19]

Simoni

[11] 4,094,026
[45] June 13, 1978

[54] BEEHIVE

[76] Inventor: Donald J. Simoni, 177 Pixley St., San Francisco, Calif. 94123

[21] Appl. No.: 731,964

[22] Filed: Oct. 13, 1976

[51] Int. Cl.² .................... A01K 47/00; A01K 47/06
[52] U.S. Cl. ................................................. 6/1; 6/4 B
[58] Field of Search .......................... 6/1, 4 R, 4 B, 11

[56] References Cited

U.S. PATENT DOCUMENTS

| | | | |
|---|---|---|---|
| 1,554,305 | 9/1925 | Sullivan | 6/4 B |
| 3,088,134 | 5/1963 | Abel | 6/1 |

Primary Examiner—Hugh R. Chamblee
Attorney, Agent, or Firm—Townsend and Townsend

[57] ABSTRACT

An indoor observation beehive is disclosed which comprises an enclosed brood chamber and an enclosed honey chamber which can be isolated from the brood chamber. Two gated passageways are provided between the two chambers, and a queen excluder is mounted across the first passageway in order to restrict the queen bee to the brood chamber. The gate in the second passageway is formed by a one-way bee trap or escape. The bee escape comprises a tube with a bee entrance, a bee exit, and a pair of convergent flexible reeds which permit a bee to pass in only one direction. Longitudinal slots are provided in the walls of the bee escape adjacent the reeds, and small holes are provided in the side of the second passageway which align with the slots in the bee escape so that a rod may be inserted into the bee escape at selected locations. With a rod inserted into the bee escape, the second passageway can be cleaned of polypropolis, or old and weak bees can be freed by suitable longitudinal movement of the bee trap. Normally the second passage is maintained closed and the first passage is opened for the passage of worker bees. To harvest honey the first passage is closed, and the second passageway through the one-way bee trap is opened to allow the bees to naturally migrate from the honey chamber. Thereafter the honey can be harvested from the evacuated and isolated honey chamber without exposure to bees.

2 Claims, 5 Drawing Figures

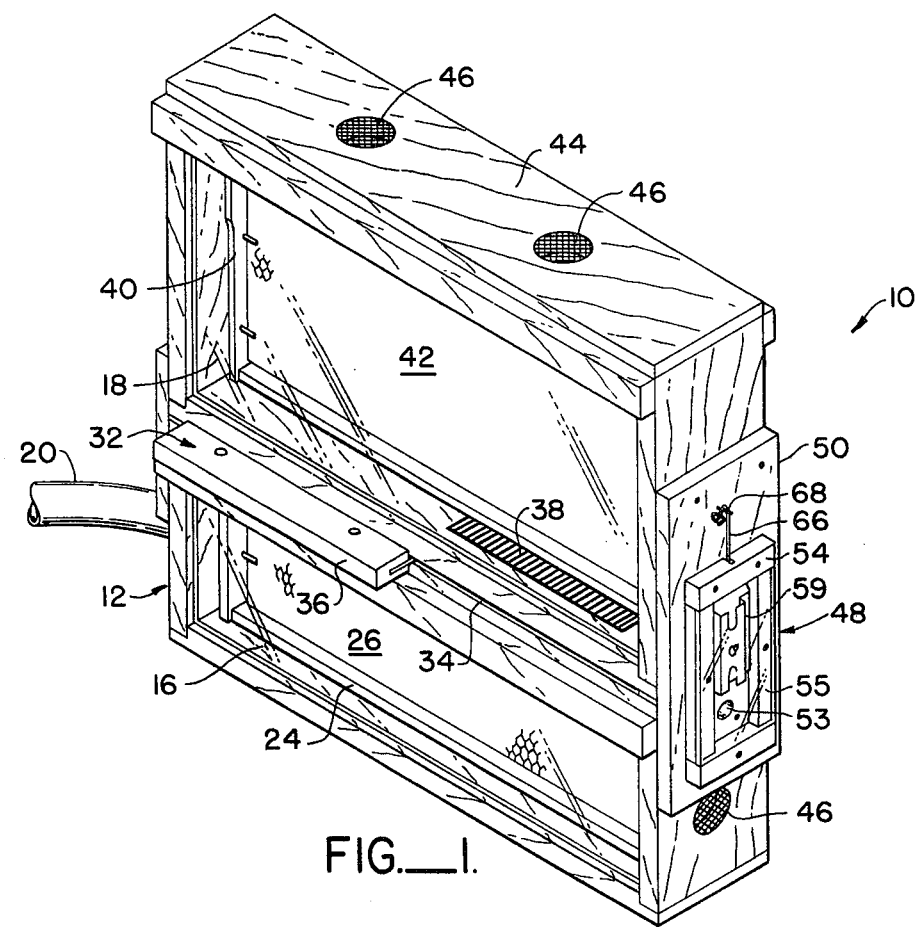
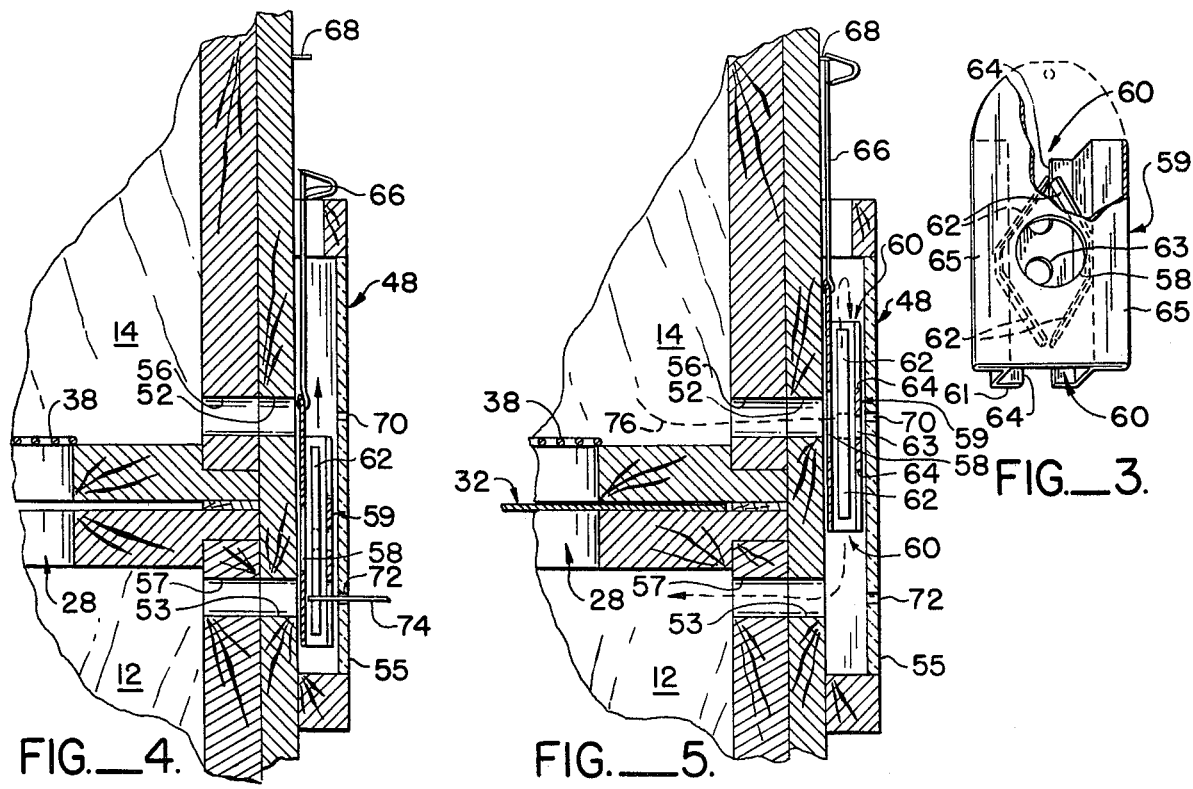

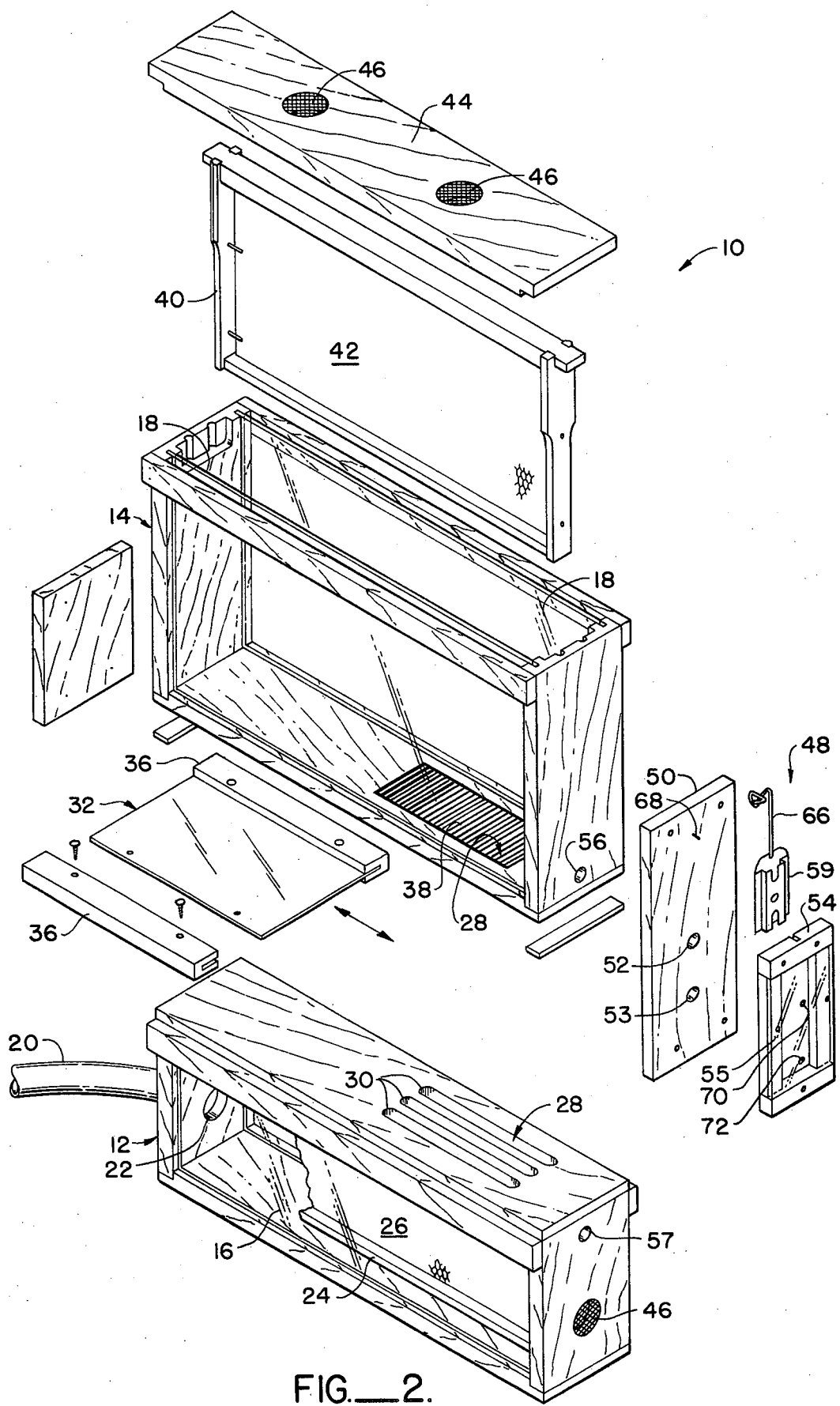
FIG._2.

BEEHIVE

BACKGROUND OF THE INVENTION

This invention relates to an indoor observation beehive and particularly to an observation hive from which honey can be harvested without releasing bees from the hive.

Honey bees are among the most fascinating and useful insects. One of the best ways to study the habits of bees is in an observation hive. An observation hive is typically a box with a generally vertical observation window or windows providing a view of the colony. Observation hives are generally constructed only to observe the bee life cycle. It is difficult to maintain a permanent colony in an observation hive since observation hives are seldom constructed to prevent swarming. Moreover, it is difficult to harvest honey from any hive, including from an observation hive, without upsetting the bees or without exposing oneself to the bees.

A beehive especially adapted for harvesting honey is generally divided into two chambers, a brood chamber and a honey chamber, generally called a super, joined by a single passageway. In a typical hive, a queen bee lays eggs in the brood chamber and worker bees collect and deposit surplus honey in the super. For this purpose at least one frame is mounted in each chamber, each of which supports a foundation on which a comb may be built for containing the cells in which the brood is hatched or honey stored.

In an observation hive, it is generally not possible to utilize relatively sophisticated procedures of expanding the hive to cultivate a stable, permanent colony. Therefore, stability must be maintained by other means. If, for example, the brood chamber is much larger than the honey super, the hive will rapidly overpopulate, and as a result of overpopulation, the bees will swarm. Although swarming is not a particularly dangerous phenomenon, the sight of menacing looking bees can be frightening. Furthermore, swarming is a threat to the survival of the colony, since as much as 95% of the bees may be lost from the hive. Therefore, to promote maximum production of surplus honey, it is desirable to prevent swarming.

Honey bees generate a substance known as bee glue or polypropolis, which is used by the bees to fill up cracks and seal openings in the hive. Bees particularly tend to fill in any area of the hive which is not spaced within a tolerance known as bee space. A bee space may vary from 3/16 to ⅜ of an inch. Bee space is the area through which a bee may freely pass. If any area is smaller than bee space, the bees cannot get through and will therefore seal up the space. If the space on the other hand is greater than bee space, the bees will bridge it with cross combs or burr combs.

In the past, in order to harvest honey, it has been necessary to occasionally open and disassemble the hive and to clean away the polypropolis and burr combs, particularly around entrances and passageways. Bees are generally gentle except when aroused or when the hive is threatened. Prior art beehive designs have made it difficult to harvest honey or to service the hive without exposing the beekeeper to bees in the hive. Bees can be driven from the hive for short periods by smoking or fuming the hive. However, frequent smoking of the hive or the use of a fume board can be dangerous practice because it tends to upset the bees, causing them thereafter to become quite mean. Moreover, there is still the danger of exposure to bees according to both methods.

As a result of these combined problems, there is no known observation hive for containing a relatively permanent colony of bees from which honey can be readily and simply harvested, and which can also be cleaned and maintained without unnecessarily upsetting the bees in the colony.

SUMMARY OF THE INVENTION

According to the invention, an indoor observation beehive is provided from which honey can be harvested with substantially no danger of exposure to bees within the hive. The structure comprises an enclosed transparent brood chamber and a separate enclosed transparent honey chamber or super from which bees can be evacuated to permit safe access to the honey. For this purpose, passageways are provided between the two chambers, the first passageway being preferably between adjoining walls of the two chambers and the second passageway being disposed to bridge a portion of the adjoining edge of the two chambers. A sliding gate is preferably provided between the adjoining walls for blocking and unblocking the first passageway. A queen excluder is mounted across the first passageway in order to restrict the queen bee to the brood chamber. The gate in the second passageway is formed by a one-way bee trap or escape. The bee escape preferably comprises a rectangularly-shaped tube having a bee entrance, which may be a lateral middle opening to admit bees, a bee exit at each end of the tube and a pair of convergent flexible reeds at each exit which permit a bee to pass in only one direction. Longitudinal slots are provided in the walls of the bee escape adjacent the reeds, and small holes are provided in the side of the second passage aligned with the slots in the bee escape so that a rod may be inserted into the bee escape at selected locations. A rod inserted into the slot of the bee escape can be used for cleaning out or for freeing old and weak bees which may have become lodged in the escape tube. In particular, by suitable longitudinal movement of the bee escape in the passageway with a rod inserted, a bee caught in the tube can be urged between the flexible reeds. Thus, the beekeeper need never be exposed to the bees. Access to the beehive may be provided through a plastic tube or other passage from a brood chamber to a window or outer wall. The free space in the hive, especially around entrances, exits and passageways is established within the so-called bee space to minimize the bees' tendency to construct blocking structures therein. In order to prevent excessive swarming due to overpopulation in the hive and to promote a relatively stable, permanent colony, the ratio of the area of the honey chamber to the area of the brood chamber is selected to be on the order of between 2 and 3 to 1. Honey is harvested by closing the first passage and opening the second passage containing the one-way bee escape and waiting a period of time to allow the bees to naturally migrate from the honey chamber to the brood chamber where the queen bee is located. Thereafter the honey can be harvested from the evacuated and isolated honey chamber without exposure to the bees.

An object of the invention is to provide an observation beehive from which honey can readily be harvested.

A further object of the invention is to provide a beehive from which honey can be harvested without exposure to the bees.

A still further object of the invention is to provide an observation beehive suitable to maintain a stable, semi-permanent colony.

A specific object of the invention is to provide an observation beehive which requires a minimum of cleaning and which can be readily cleaned if needed, without exposure to the bees.

A further object of the invention is to provide means within the beehive to encourage relatively rapid evacuation of bees from one chamber to another.

A still further specific object is to provide means within the beehive to free bees trapped within narrow passageways without exposure to the bees.

These and other objects of the invention will best be understood by reference to the following detailed description, taken in conjunction with the accompanying drawing.

BRIEF DESCRIPTION OF THE DRAWINGS

FIG. 1 is an isometric view of an observation beehive according to the present invention;

FIG. 2 is an exploded view in partial cutaway of the beehive for illustrating the assembly of the beehive of FIG. 1;

FIG. 3 is a perspective view in partial cutaway of a bee escape according to the invention;

FIG. 4 illustrates passageways in the beehive with gates in a first position; and FIG. 5 illustrates passageways in the beehive with gates in a second position.

DETAILED DESCRIPTION OF PREFERRED EMBODIMENTS

Referring to FIGS. 1 and 2, an observation beehive 10 is illustrated comprising a first or brood chamber 12, a second chamber or super 14, each with transparent viewing windows 16 and 18. The windows 16 and 18 may be plastic or glass, and the observation beehive 10 can be mounted indoors. A tube 20 opening into the brood chamber 12 through an entrance 22 can extend through a wall or a window to the out-of-doors to provide ingress and egress for the bees.

The brood chamber 12 contains a frame 24 upon which is mounted a wax brood foundation 26 wherein the workers can build a comb and the queen bee can lay her eggs. The frame 24 and foundation 26 with the comb construction are spaced between 3/16 and ⅜ of an inch from the sides and end walls to provide the proper spacing for free movement of the bees, or the so-called bee space.

As shown most clearly in FIG. 2, a first passageway 28 is provided between brood chamber 12 and super 14. Passageway 28 comprises a plurality of long slots 30, each having a width corresponding to the bee space. The slots 30 may be relatively long so that a maximum number of worker bees can pass through freely in either direction, notwithstanding the relatively restrictive bee space.

A knife gate 32 is slidably mounted between brood chamber 12 and super 14 along a slot 34 through the passageway 28. The knife gate 32 may be a sheet of metal with one or more handles 36 on the sides so that the gate 32 can be gripped and slid conveniently along the track 34. As a further convenience, at least one handle 36 can be removed, as shown in FIG. 2, so that the gate 32 can be withdrawn from between brood chamber 12 and super 14 for cleaning or when no gate is needed. A knife gate of this design is preferred since bees are less likely to block it with polypropolis to render it nonfunctional.

In order to prevent the queen bee from entering into the super 14, a queen excluder 38 is mounted in the path of passageway 28. The queen excluder 38 is a wire grid through which the queen bee and drone bees cannot pass. The excluder 38 thereby assures that no eggs are layed in super 14. The queen excluder 38 is preferably mounted on the super side of gate 32 above the passageway 28 so that it can be accessed or removed for occasional cleaning, as necessary. In addition, the space under the excluder 38 adjacent passageway 28 is hollowed out so that the bees can have full access to the excluder grid.

Within the super 14 is mounted a removable frame 40 supporting a wax foundation 42. Super 14 includes a top 44 which is removable to permit access to the honey frame 40, as necessary for harvesting. Screened holes 46 are provided in both the top 44 and in the sides of brood chamber 12 for ventilation.

One way to minimize the likelihood of swarming is to limit the size of the brood chamber 12 relative to the super 14 so that the colony does not overpopulate. In particular, it has been found that the honey super 14 should be between two and three times the size of the brood chamber 12, and preferably about two and one half times the size of the brood chamber 12 in order to produce maximum population stability while providing adequate honey surplus production.

An important feature of the invention is a second passageway 48 providing an alternate bee path between super 14 and brood chamber 12. Unlike first passageway 28, second passageway 48 constrains the bees to move only from super 14 into brood chamber 12.

The second passageway 48 comprises a path formed by a sideboard 50 bridging the adjacent side walls of the super 14 at brood chamber 12, with bee space sized orifices 52 and 53 therethrough which mate with bee space sized orifices 56 and 57 through the side walls of the super 14 and brood chamber 12, respectively, and which are separated by a gated one-way cavity. In particular, mounted onto the sideboard 50 is a shallow hollow box 54 with an observation window 55 on the broad external side forming the cavity. Within the cavity by the sideboard 50, the box 54 and the viewing window 55 is mounted a one-way bee escape 59 also forming the gate. The bee escape 59 may be a modified version of the standard bee escape available from bee keeper suppliers such as the A. I. Root Co. of Council Bluffs, Iowa, or it may be embodied in other forms incorporating similar operating principles.

As shown in cutaway in FIG. 3, the preferred bee escape 59 comprises a generally flat rectangular cross-section tube 61 having a bee entrance opening 58 in the side of the tube, and exit openings 60 at each end of the tube. The entrance opening 58 is preferably in the back wall of the bee escape tube 61. Opposite the entrance opening 58 in the front wall is a port 63 which is generally smaller than entrance opening 58. The distance between the front and back walls of tube 61 is selected to correspond to the thickness of box 54 so that the port 63 is always covered by the transparent window 55 so the bees cannot pass through the port 63. The bee escape 59 further includes lateral flanges 65 which protrude from the sides of tube 61 to maintain the passages in the box 54 along with the sides of tube 61 corresponding to bee space.

Between the entrance opening 58 and each exit opening 60 there is a pair of flexible reeds 62 which converge toward each exit opening 60 to form the one-way bee gate. In the side of the tube 61 over each of the convergent reeds 62, a thin longitudinal slot 64 is provided to allow access to the one-way gate area.

The bee escape 59 is slidably mounted in the box 54 of passageway 48 with the entrance opening 58 confronting the sideboard 50. The entrance opening 58 can be lined up with orifice 52. The bee escape 59 can be affixed in either of two positions. In one position, the bee escape 56 may be hung by a hooked wire 66 from a nail 68 in the sideboard 50, aligning the entrance opening 58 with opening 52 as shown in FIG. 5. In another position, the bee escape 56 may hang near the bottom of box 54 on the hooked wire 66 so the back wall blocks both openings 52 and 53, as shown in FIG. 4.

FIG. 4 and FIG. 5 further illustrate particular features of the invention. As previously mentioned, bees are prone to block any opening which is not within the dimensions of the bee space (and in some cases even those that are within bee space). This would be a particular problem in the passageway openings 52 and 53 and also within the bee escape 59 where the delicate reeds 62 converge. Therefore, the slots 64 in the bee escape 56 are provided in order to permit access to the convergent region of reeds 62 so the reeds 62 can be cleaned easily. Further in order to permit access to the slots 64, small holes 70 and 72 are provided through the window 55. The holes 70 and 72 are aligned with the orifices 52 and 53, respectively. The holes 70 and 72 permit the insertion of a cleaning rod 74, or the like, through the window 55 and into slots 64 of the bee escape 56. In addition, the rod 74 may be inserted through the passageway 48 into openings 52 and 53 for cleaning, as needed, without exposing oneself to the bees.

In addition, rod 74 may be used to free weak and old bees which may be caught in reeds 62 without opening the box 54. For example, to free a trapped bee, rod 74 may be inserted through the small holes 70 or 72 and into one of the slots 64 behind the bee so that the bee is between the rod 74 and exit opening 60. Holding the rod 74 in place, the bee escape is translated, for example, from the position of FIG. 4 to the position of FIG. 5, to urge the bee through the bee escape exit opening 60. Thus the honey super 14 can be completely evacuated without exposure to the bees.

The relative size of the honey super 14 and brood chamber 12 have an important effect on the stability of the hive. One way to minimize the likelihood of swarming is to limit the size of the brood chamber 12 relative to the super 14 so that the colony does not overpopulate. In particular, it has been found that the honey super 14 should be between two and three times the size of the brood chamber 12, and preferably about two and one-half times the size of the brood chamber 12 in order to produce maximum population stability while providing adequate honey surplus production.

In order to harvest honey from a hive, it is necessary to evacuate the super 14. Normally, the gate 32 is in the open position, as shown in FIG. 1, or removed from between brood chamber 12 and honey super 14. In addition, the gate of second passageway 48, namely the bee escape 59, is in the closed position of FIG. 4, blocking openings 52 and 53. To evacuate the bees from the super 14, the gate 32 is slid to block the first passageway 28, and the alternate passage through second passageway 48 is opened by hooking wire 66 supporting bee escape 59 on nail 68. Bees in the honey super 14 will naturally migrate to the brood chamber 12 as indicated by arrow 76, since the worker bees tend naturally to migrate to the location of the queen bee constrained to the brood chamber 12. In addition, the bees in honey super 14 will be attracted to the light through port 63 in the bee escape 59, particularly if viewing windows 18 are covered. The bees are constrained from returning to the honey super 14 by the reeds 62 blocking the path. Following a normal course, bees will evacuate from the honey super 14 in less than 24 hours. Evacuation can be further speeded by the placement of a weak acid solution, such as vinegar, on or near the air vents 46 in top 44 so that the fumes permeate into the super 14. Bees trapped in bee escape 59 can be removed as had been described. Thereafter, top 44 may be removed and the honey-containing frame 42 can be withdrawn without any danger of exposure to bees.

The invention has been described with reference to specific embodiments. Other embodiments will be apparent to persons having ordinary skill in the relevant art in light of the present disclosure. It is therefore, not intended that the invention be limited, except as indicated by the appended claims.

I claim:

1. An observation beehive comprising a first chamber for enclosing brood nest; a second chamber for enclosing removable honey frame; first and second passageways between said first and second chambers, said first passageway including means for excluding a queen bee and a first gate for blocking and unblocking said first passageway, said second passageway including a second gate having a first closed position and a second open position, and means for permitting one-way passage of bees from said first closed position and a second open position, and means for permitting one-way passage of bees from said second chamber to said first chamber, said second passageway communicating with said one-way passage permitting means, said one-way passage permitting means comprising a tube having a side wall, at least one bee entrance opening and at least one bee exit opening, said tube containing a pair of flexible reeds convergent to said exit opening for permitting a single bee to pass in only one direction, said side wall defining said second gate, said tube further including means for defining a longitudinal slot adjacent said reeds, said second passageway including a lateral opening alignable with said tube slot to allow insertion of a rod transverse of said tube between said reeds.

2. An observation beehive according to claim 1, wherein said tube is longitudinally translatable within said second passageway such that a bee within said tube may be urged through said convergent reeds by a rod inserted into said tube through said lateral opening.

* * * * *